US011797085B1

(12) United States Patent
Zolin et al.

(10) Patent No.: US 11,797,085 B1
(45) Date of Patent: Oct. 24, 2023

(54) EYE TRACKING SYSTEM AND METHOD

(71) Applicant: LENOVO (SINGAPORE) PTE. LTD, New Tech Park (SG)

(72) Inventors: Inna Zolin, Cary, IN (US); Matthew Fardig, Boonville, NC (US); Lindsay Nelson, Highlands Ranch, CO (US); Joshua Smith, Milton, FL (US)

(73) Assignee: LENOVO (SINGAPORE) PTE LTD, New Tech Park (SG)

( * ) Notice: Subject to any disclaimer, the term of this patent is extended or adjusted under 35 U.S.C. 154(b) by 0 days.

(21) Appl. No.: 17/657,278

(22) Filed: Mar. 30, 2022

(51) Int. Cl.
*G06F 3/01* (2006.01)
*G02B 27/01* (2006.01)
*G02B 27/00* (2006.01)

(52) U.S. Cl.
CPC ......... *G06F 3/013* (2013.01); *G02B 27/0093* (2013.01); *G02B 27/017* (2013.01); *G02B 2027/0178* (2013.01)

(58) Field of Classification Search
CPC ............... G02B 27/0172; G02B 30/52; G02B 2027/0127; G09G 3/20; G09G 3/28; G09G 3/32; G09G 3/3233; G09G 3/36; G09G 2300/0413; G09G 2300/0426; G09G 2330/08; G09G 2330/10; G09G 2330/12; Y02D 10/00
See application file for complete search history.

(56) References Cited

U.S. PATENT DOCUMENTS

| 10,969,584 | B2 * | 4/2021 | Haddick | G06F 1/163 |
| 2017/0031435 | A1 * | 2/2017 | Raffle | G02B 27/017 |
| 2020/0371370 | A1 * | 11/2020 | Ouderkirk | G02B 5/3025 |
| 2022/0299773 | A1 * | 9/2022 | Mills | G06T 7/70 |

* cited by examiner

*Primary Examiner* — Nelson M Rosario
(74) *Attorney, Agent, or Firm* — THE SMALL PATENT LAW GROUP LLC; Dean D. Small

(57) ABSTRACT

An eye tracking system includes an imaging device, a memory, and a controller. The imaging device is configured to be mounted on a wearable device. The wearable device includes at least a first lens that is light transmissive and is positioned in front of at least a first eye of a user that is wearing the wearable device. The imaging device has a field of view that captures an inner surface of the first lens and a reflection of the first eye on the inner surface. The memory is configured to store program instructions. The controller is operably connected to the memory and the imaging device. The program instructions are executable by the controller to analyze image data generated by the imaging device and to detect a position of a pupil of the first eye in the reflection based on the analysis of the image data.

19 Claims, 5 Drawing Sheets

EYE TRACKING SYSTEM AND METHOD

FIELD

The present disclosure relates to eye tracking technology.

BACKGROUND OF THE INVENTION

Eye tracking technology is used in various applications, such as virtual reality gaming, augmented (or mixed) reality devices, and even in automobiles to monitor driver awareness. Eye tracking technology attempts to discern where the subject is looking (or gazing) based on the positioning of the subject's eye or eyes. A current method of eye tracking involves emitting infrared (IR) light towards the subject's eye(s), such as into the pupil. One drawback of this method is that an IR light source may be relatively expensive and/or complex. A device that uses IR light for eye tracking may require a significant number of components. Another, potentially more significant drawback is that shining the IR light at the eye(s) may be relatively invasive, uncomfortable, and/or distracting for the subject. Furthermore, the light source may be in the field of view of the subject. The light source may undesirably obstruct the subject's view of objects in the surrounding environment, and/or may distract the subject by drawing the eye away from the surrounding environment.

A need remains for a system and method that detect the position of a subject's pupil for reliable, accurate eye tracking, without using IR light and without positioning hardware in front of the subject's eyes.

SUMMARY

In accordance with an embodiment, an eye tracking system is provided that includes an imaging device, a memory, and a controller. The imaging device is configured to be mounted on a wearable device. The wearable device includes at least a first lens that is light transmissive and is positioned in front of at least a first eye of a user that is wearing the wearable device. The imaging device has a field of view that captures an inner surface of the first lens and a reflection of the first eye on the inner surface. The memory is configured to store program instructions. The controller is operably connected to the memory and the imaging device. The program instructions are executable by the controller to analyze image data generated by the imaging device and to detect a position of a pupil of the first eye in the reflection based on the analysis of the image data.

Optionally, the imaging device is configured to generate the image data in a visible wavelength range. Optionally, the imaging device is mounted such that the field of view does not directly capture the first eye of the user. The eye tracking system may include a light source configured to be mounted to the wearable device and to emit light towards the inner surface of the first lens for providing the reflection. The controller may be configured to detect the position of the pupil in the reflection relative to one or more of the first eye in the reflection, the first lens in the reflection, or the field of view of the imaging device. Optionally, the eye tracking system includes the wearable device, which is eyeglasses or goggles.

Optionally, the controller is configured to segment the image data to a foreground environment and an external environment. The foreground environment includes the inner surface of the first lens and the reflection. The external environment is disposed beyond the first lens. The controller may be configured to determine a location in the external environment to which a gaze of the first eye is directed based on the position of the pupil and a correlation between the foreground environment and the external environment. The controller may be configured to analyze the image data and identify an object at the location in the external environment to which the gaze is directed. The controller may be configured to perform an operation based on the object that is identified. For example, the controller may be configured to control a display device to display graphic indicia on a display screen visible to the user. The graphic indicia relates to the object that is identified. The eye tracking system may include the display device which is configured to be mounted on the wearable device and to display the graphic indicia relating to the object on at least the first lens for viewing by the user.

Optionally, the controller is configured to detect the position of the pupil of the first eye in the reflection by calculating coordinates of a center point of the pupil in the reflection within a foreground reference frame in the image data. The controller may be configured to determine a location in an external environment to which a gaze of the first eye is directed by inputting the coordinates of the center point of the pupil into a transfer function that represents a correlation between the foreground reference frame and an external reference frame.

In accordance with an embodiment, a method is provided that includes analyzing image data generated by an imaging device mounted on a wearable device. The wearable device includes at least a first lens that is light transmissive and positioned in front of at least a first eye of a user that is wearing the wearable device. The imaging device has a field of view that captures an inner surface of the first lens and a reflection of the first eye on the inner surface. The method includes detecting a position of a pupil of the first eye in the reflection based on the analysis of the image data.

Optionally, the method includes removably attaching the imaging device to a frame of the wearable device. Optionally, detecting the position of the pupil includes detecting the position of the pupil in the reflection relative to one or more of the first eye in the reflection, the first lens in the reflection, or the field of view of the imaging device.

Optionally, the method includes segmenting the image data between a foreground environment and an external environment. The foreground environment includes the inner surface of the first lens and the reflection. The external environment is disposed beyond the first lens relative to the imaging device. The method includes determining a location in the external environment to which a gaze of the first eye is directed based on the position of the pupil and a correlation between the foreground environment and the external environment. Optionally, the method includes identifying an object at the location in the external environment to which the gaze is directed. The method may further include controlling a display device to display graphic indicia on a display screen visible to the user. The graphic indicia relates to the object that is identified.

In accordance with an embodiment, a computer program product is provided that includes a non-transitory computer readable storage medium. The non-transitory computer readable storage medium includes computer executable code configured to be executed by one or more processors to analyze image data generated by an imaging device mounted on a wearable device. The wearable device includes at least a first lens that is light transmissive and positioned in front of at least a first eye of a user that is wearing the wearable device. The imaging device has a field of view that captures an inner surface of the first lens and a reflection of the first eye on the inner surface. The computer executable code is configured to be executed by one or more processors to detect a position of a pupil of the first eye in the reflection based on the analysis of the image data.

DETAILED DESCRIPTION

Figure 1:
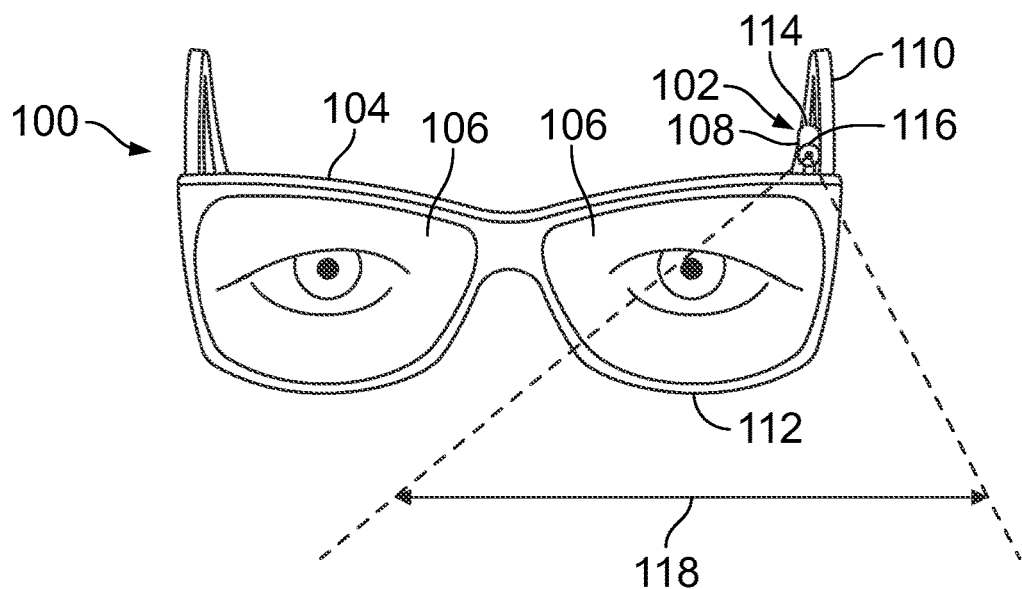
FIG. 1 illustrates a wearable device that includes an eye tracking system according to an embodiment.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

References herein to "machine learning" and "artificial intelligence" refer to algorithms that learn from various automatic or manual feedback, such as observations and/or data. The artificial intelligence algorithms may be adjusted over multiple iterations based on the observations and/or data. For example, the artificial intelligence algorithms may be adjusted by supervised learning, unsupervised learning, and/or reinforcement learning (e.g., customer feedback). Non-limiting examples of artificial intelligence algorithms include decision trees, K-means, deep learning, artificial neural networks, and/or the like.

References herein to "subject" and "user" refer to a person whose eye (e.g., pupil) is being tracked by the system and method disclosed herein. For example, the user may be a person that is wearing a wearable device on which the eye tracking system, or a portion thereof, is mounted.

Embodiments described herein disclose an eye tracking system and method that detects the position of a user's pupil for reliable, accurate eye tracking. The system and method disclosed herein may not emit or otherwise utilize IR light. The system and method may not locate hardware in front of the subject's eyes, such that the hardware does not impede the user's vision. The eye tracking system and method disclosed herein detects a position of the pupil based on a reflection of the user's eye on an inner surface of a lens. The lens may be a light transmissive lens through which the user see through to visualize the external environment surrounding the user. In one example application, the lens is a lens of eyeglasses worn by the user. The eye tracking system includes an imaging device that is positioned to capture the inner surface of the lens in image data generated by the imaging device. The imaging device may be mounted on a wearable device that is worn by the user such that the imaging device is out of the way of the user's direct line of sight to the external environment. For example, the imaging device may be mounted to the side of the user's eye, such as proximate to the user's ear, rather than in front of the eye. In the eyeglasses example, the imaging device may be mounted to one temple of the eyeglasses frame.

The eye tracking system and method analyze the image data generated by the imaging device and detect the position of the pupil of the user's eye based on the reflection of the pupil on the lens inner surface, as depicted in the image data. The system and method may monitor the position of the pupil over time to detect eye movements of the user. In an embodiment, the eye tracking system and method may determine a gaze direction of the user into the external environment based on the position of the pupil and the image data generated by the imaging device. For example, the image data may depict a portion of the external environment that is beyond the lens. The depicted portion of the external environment may be through the light transmissive lens and/or outside of a perimeter of the lens.

The eye tracking system and method may use a correlation between the detected position of the pupil in the reflection and the depicted portion of the external environment to determine a location in the external environment to which the user's gaze is directed. In an embodiment, the eye tracking system and method may analyze the image data and identify an object present at the location in the external environment indicated by the gaze direction. For example, the object may be identified as a sign, a natural formation, a plant, an animal, a building, a vehicle, a phone, and/or the like. The eye tracking system and method may perform an operation based on the identity of the object to which the user is looking (e.g., gazing). For example, the system and method may present information about the object to the user. The information may be displayed on the lens itself or on a discrete display device. In another example, the system and method may alert the user via displaying a flashing light or message, emitting a warning tone, or the like, if the identified object indicates that the user's gaze is outside of a designated viewing zone. This example may be relevant for ensuring that vehicle operators (e.g., drivers) are alert and focused the route and the operation of the vehicle. Additional details and example applications of the eye tracking system and method are described herein with reference to the appended figures.

FIG. 1 illustrates a wearable device 100 that includes an eye tracking system 102 according to an embodiment. The wearable device 100 is worn by a user on the user's head. The wearable device 100 includes a frame 104 and at least one lens 106 held by the frame 104. The wearable device 100 in the illustrated embodiment includes two lenses 106, each located in front of a different corresponding eye of the user when the device 100 is properly worn. For example, the wearable device 100 may be eyeglasses. The lenses 106 may be light transmissive, such that the user can view the external environment through the lenses 106. The lenses 106 may be transparent, or at least translucent, like typical eyeglass lenses.

The external environment as used herein refers to portions of a respective field of view beyond the lenses 106 and the user's face. A user wearing eyeglasses may be able to view the lenses, the rim of the glasses surrounding the lenses, a portion of the temples connected to the rims, a tip of the user's nose, and/or the like. These elements are referred to herein as within a foreground environment. The user would also be able to see objects in the external environment, beyond the glasses and the user's face, such as the ground, the sky, natural wildlife, other people, buildings, vehicles, computers, the user's arms and legs, and/or the like.

In an embodiment, the wearable device 100 may be augmented (or mixed) reality "smart" glasses that provide a head-up display. The eye tracking system 102 may display information to the user on one or both lenses 106 to supplement the visual information inherently provided by the external environment. Alternatively, the wearable device 100 does not present a head-up display on either of the lenses 106 of the eyeglasses. In other embodiments, the wearable device 100 may be goggles with a lens that laterally extends across both eyes of the user. One example type of goggles is a virtual reality (VR) headset. The wearable device may be other types of wearable devices in other embodiments, such as a monocle, a rear view mirror assembly for a bicycle helmet, a light transmissive face shield, and/or the like.

The eye tracking system 102 includes an imaging device 108. The imaging device 108 is mounted to the frame 104 of the wearable device 100. In the illustrated embodiment, the imaging device 108 is mounted to a temple 110 of the eyeglasses, which extends from the lens 106 and rim 112 back to the user's ear. The imaging device 108 may be located to the side of the user's eyes. The imaging device 108 may be outside of the user's direct line of sight (e.g., only visible in the user's peripheral vision or not event visible in the user's peripheral vision). The imaging device 108 may be oriented such that a field of view 118 of the imaging device 108 substantially overlap the field of view of at least one of the user's eyes. For example, the imaging device 108 may be oriented in a forward direction, similar to the general viewing direction of the user's eyes. As described herein, the imaging device 108 captures the user's pupil in a reflection on an inner surface of the lens 106 that is closest to the imaging device 108.

In an embodiment, additional components of the eye tracking system 102 may be packaged with the imaging device 108 in or on a housing 114 that is mounted to the frame 104 as shown in FIG. 1. For example, a controller, a memory device, and a power source may be disposed within the housing 114. The components of the eye tracking system 102 mounted to the wearable device 100 define an eye tracking device 116 or assembly. In an embodiment, all of the components of the eye tracking system 102 described with reference to FIG. 2 may be integrated within the eye tracking device 116. The components may be relatively small and tightly packed to provide a compact form factor. The mounting location and compact size of the eye tracking system 102 may allow the user's vision of the external environment to be unimpeded by the eye tracking system 102. In an alternative embodiment, one or more of the components of the eye tracking system 102 may not be mounted on the wearable device 100, and may communicate with components on the wearable device 100 via a wired or wireless communication link.

Optionally, the eye tracking device 116 may be designed to be removable to enable installation on different wearable devices. For example, a user may want to retrofit an existing pair of eyeglasses with the eye tracking device 116, and another user may want to switch the eye tracking device 116 between different wearable devices for different use applications. The eye tracking device 116 may include a clip, fasteners, or the like, to enable secure, but non-permanent, coupling of the eye tracking device 116 to the wearable device 100.

The eye tracking system 102 in FIG. 1 has a single eye tracking device 116 with a single imaging device 108. The eye tracking system 102 detects the position of the pupil of a first eye of the user based on a reflection along a first lens 106A of the two lenses 106. The eye tracking system 102 may not detect the position of the pupil of the user's other eye in the illustrated embodiment. In an alternative embodiment, the eye tracking system 102 may include two eye tracking devices (e.g., two imaging devices) for monitoring the position of both pupils. In another embodiment, the imaging device 108 may be positioned and oriented to capture the reflection of both eyes in the image data generated by the imaging device 108, which enables dual eye tracking. For example, the imaging device 108 may be installed on the wearable device between the user's eyes such that the field of view encompasses reflected views of both eyes. The imaging device 108 between the user's eyes may be disposed above or below the eyes to avoid interfering with the user's vision, or at least limit the interference.

Figure 2:
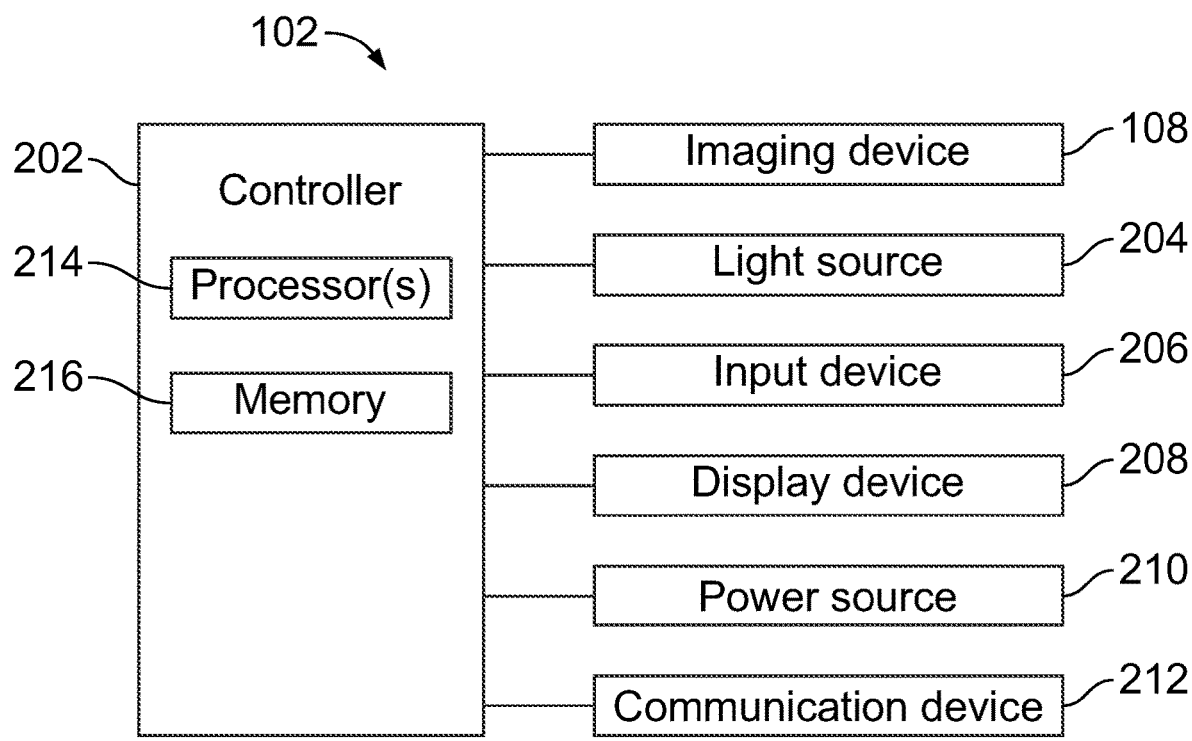
FIG. 2 is a block diagram of the eye tracking system according to an embodiment.

FIG. 2 is a block diagram of the eye tracking system 102 according to an embodiment. The eye tracking system 102 includes a controller 202 that performs some or all of the operations described herein to detect the position of the pupil of a user's eye based on a reflection in the lens 106. The eye tracking system 102 may also include the imaging device 108, a light source 204, an input device 206, a display device 208, a power source 210, and a communication device 212. The controller 202 is operably connected to the other components of the eye tracking system 102 via wired and/or wireless communication links to permit the transmission of information and/or commands in the form of signals. For example, the controller 202 may generate control signals that are transmitted to the other components to control operation of the components. The eye tracking system 102 may have additional components that are not shown in FIG. 2. In an alternative embodiment, the eye tracking system 102 may lack one or more of the components that are shown in FIG. 2, such as the communication device 212, the input device 206, or the display device 208 as examples.

The controller 202 represents hardware circuitry that includes and/or is connected with one or more processors 214 (e.g., one or more microprocessors, integrated circuits, microcontrollers, field programmable gate arrays, etc.). The controller 202 includes and/or is connected with a tangible and non-transitory computer-readable storage medium (e.g., data storage device), referred to herein as memory device 216 or simply as memory. The memory 216 may store program instructions (e.g., software) that are executed by the one or more processors 214 to perform the operations described herein. The program instructions may include one or more algorithms utilized by the one or more processors 214 to analyze the image data generated by the imaging device 108 and detect the position (and movement) of the pupil in the reflected view of the user's eye on the lens 106. The one or more algorithms stored in the memory 216 may include image segmentation and processing algorithms for identifying objects depicted in the image data. The program instructions may dictate actions to be performed by the one or more processors 214, such as generating control signals to display information related to identified objects on the display device 208. The memory 216 may store information that is used by the processors 214, such as a database for storing calibration data. The calibration data may be used to correlate the position of the pupil as detected in the reflection on the lens 106 with a location in the external environment to which the user is gazing (e.g., looking). The calibration data may include a transfer function, a look-up table, and/or the like. The memory 216 optionally may store applications, such as various application program interfaces (APIs) that link to cloud hosting services, via the communication device 212, for accessing information from remote storage devices (e.g., servers).

The imaging device 108 is an optical sensor that generates optical data of the environment within the field of view 118 (shown in FIG. 1) of the imaging device 108. The optical data is referred to herein as image data. The image data is conveyed to the controller 202 for image analysis. The image data may be stored, at least temporarily, in a memory device 216 of the controller 202. The imaging device 108 may be a camera, such as a video camera that generates image data at a specific frame rate (e.g., number of individual images generated per second). The imaging device 108 may generate the image data in the visible wavelength range of the electromagnetic spectrum. In an embodiment, the imaging device 108 does not generate image data based on light in the IR wavelength range of the spectrum.

The light source 204 emits light towards the inner surface of the lens 106 to provide or enhance the reflection of the user's eye on the inner surface, relative to not actively emitting light onto the inner surface. The light source 204 may be integrated with or coupled to the imaging device 108 of the eye tracking device 116 that is mounted to the wearable device 100, as shown in FIG. 1. In an embodiment, the light source 204 does not emit IR light. The light source 204 emits light in one or more other wavelength ranges of the electromagnetic spectrum, such as the visible wavelength range.

The input device 206 receives user input selections for interacting with the eye tracking system 102. The input device 206 may include or represent one or more physical buttons, a microphone, a touch sensitive pad, a switch, or the like. A user may actuate the input device 206 to selectively activate and deactivate the eye tracking device 116 on the wearable device 100. In an alternative embodiment, the eye tracking system 102 may lack the input device 206. User input selections, such as to activate and deactivate the device 116, may be communicated to the controller 202 wirelessly via the communication device 212, rather than generated using the input device 206.

The display device 208 presents graphic indicia, such as text and/or symbols, on a display screen for viewing by the user. In an embodiment, the display device 208 presents the graphic indicia on at least one lens 106 of the wearable device 100, such as to provide a head-up display. Alternatively, the display device 208 may present the graphic indicia on another display screen that is separate from the lenses 106, such as the display screen of a smartphone, a smartwatch, a tablet computer, or other computer device operably connected to the controller 202.

The power source 210 supplies electrical energy to power the operations of the eye tracking system 102. The power source 210 may include one or more batteries, capacitors, or other energy storage devices. The power source 210 may include rechargeable batteries for extended operational life of the power source 210 before replacement, while maintaining a compact form factor of the eye tracking device 116.

The communication device 212 represents hardware circuitry that can communicate electrical signals via wireless communication pathways and/or wired conductive pathways. The communication device 212 may include transceiving circuitry, one or more antennas, and the like, for wireless communication. The communication device 106 may communicate with a cellular tower, a modem, a router, and/or the like.

Figure 3:
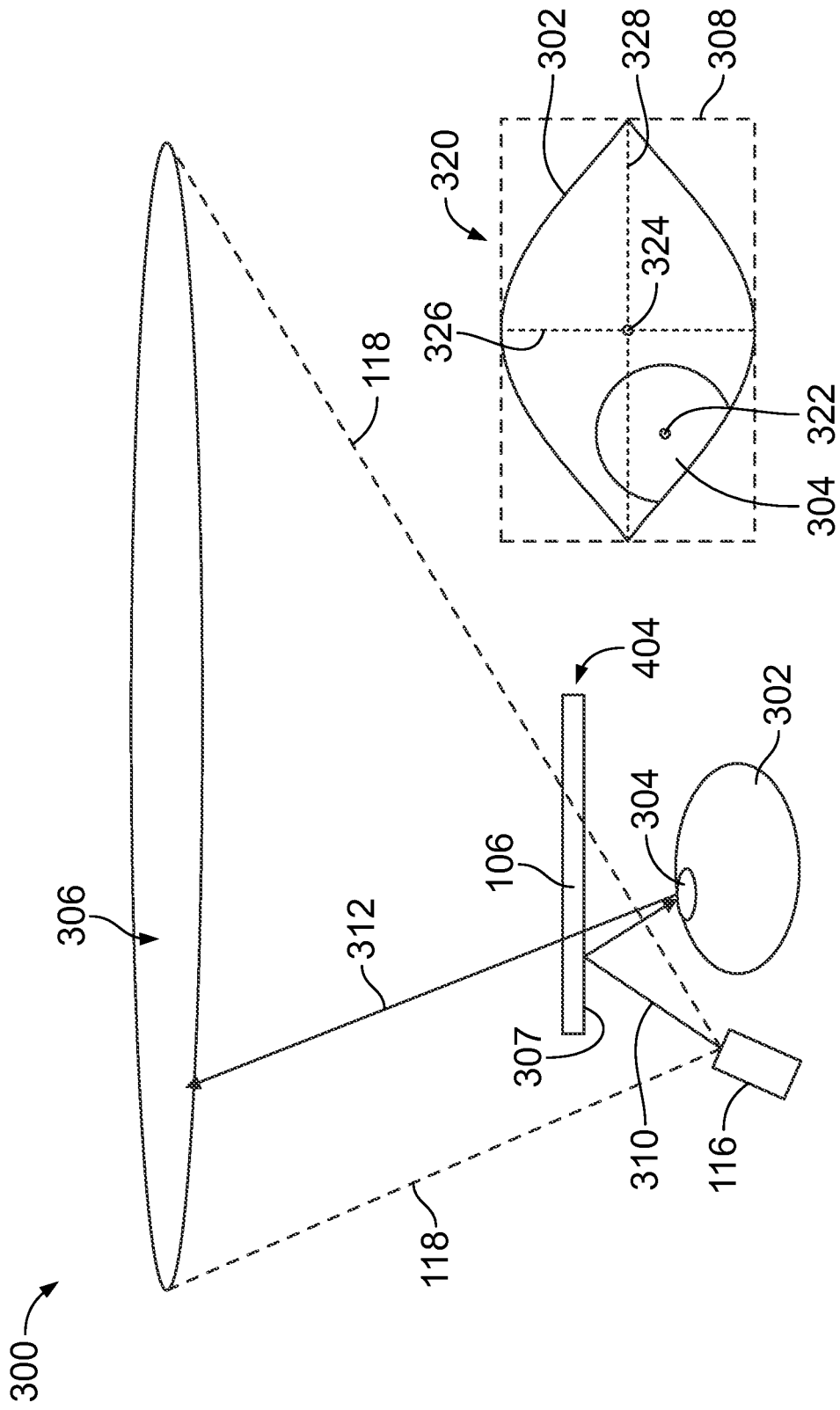
FIG. 3A is a diagram showing the eye tracking device, a lens of a wearable device, and an eye of a user that is wearing the wearable device according to an embodiment.
FIG. 3B illustrates a reflection of the user's eye on an inner surface of the lens according to the eye position shown in FIG. 3A.

FIG. 3A is a diagram 300 illustrating the eye tracking device 116, a lens 106 of a wearable device, and an eye 302 of a user that is wearing the wearable device. The wearable device itself is not depicted in FIG. 3A. The lens 106 is located in front of the user's eye 302, such that the user visualizes the external environment 306 by gazing through the lens 106. The eye tracking device 116 is mounted to the wearable device to the side of the eye 302, rather than in front of the eye 302. The eye tracking device 116 may be positioned outside of the user's direct field of view. For example, the user may only be able to indirectly see the eye tracking device 116 via a reflection on an inner surface 307 of the lens 106. The eye tracking device 116 includes at least the imaging device 108 and the light source 204 shown in FIG. 2. The field of view 118 of the imaging device 108 captures at least a portion of the inner surface 307 of the lens 106. In an embodiment, the field of view 118 does not directly capture the user's eye 302. The imaging device 108 indirectly captures the eye 302 within a reflection on the inner surface 307 of the lens 106. The light source 204 may emit light towards the inner surface 307 for providing the reflection (or enhancing the natural reflection). For example, the arrow 310 in FIG. 3A represents a beam or ray of light emitted from the light source 204 that reflects off the inner surface 307 and impinges upon a pupil 304 of the user's eye 302. The arrow 312 in FIG. 3A represents a gaze direction of the user's eye 302, indicating where the user is looking. The gaze direction extends to objects in the external environment 306.

FIG. 3B illustrates a reflection 320 of the user's eye 302 on the inner surface 307 of the lens 106 according to the eye position shown in FIG. 3A. For example, the pupil 304 in FIG. 3A is directed to the left of center, and the pupil 304 in the reflection 320 in FIG. 3B is also left of center relative to the perimeter of the eye 302. The reflected view in FIG. 3B may be a portion of the image data generated by the imaging device 108 of the eye tracking device 116. For example, the imaging device 108 generates image data that includes the reflection 320, among other subject matter captured by the imaging device 108.

In an embodiment, the controller 202 of the eye tracking system 102 analyzes the image data generated by the imaging device 108, and detects a position of the pupil 304 of the eye 302 in the reflection 320 based on the analyzed image data. The controller 202 may monitor the position of the pupil 304 in the reflection 320 over time to track eye movements (e.g., changes in the gaze direction). For example, the imaging device 108 may periodically or repeatedly generate image data over time, and the controller 202 may detect an updated position of the pupil 304 in the reflection 320 in response to receiving the new, updated image data. The controller 202 may compare the current (e.g., most recent) detected position of the pupil 304 to one or more preceding positions of the pupil 304 to track movement of the eye 302.

In an embodiment, the controller 202 detects the position of the pupil 304 relative to a reference object or frame. For example, the position of the pupil 304 may be represented as coordinates in a reference frame and/or coordinates defined relative to a reference point. The reference object or frame may include the eye 302, the lens 106, and/or the field of view 118 of the imaging device 108. For example, the perimeter of the eye 302 and/or the perimeter of the lens 106 within the reflection 320 may be used to define a frame of reference. FIG. 3B shows a reference frame 308 that is defined based on the perimeter of the eye 302 in the reflection 320. For example, the controller 202 may perform image analysis to identify perimeter edges of the eye 302, and may generate a bounding box to enclose the eye 302. The size and location of the bounding box (e.g., the reference frame 308) may be based on edge detection of another image analysis technique. Once the reference frame 308 is established, the controller 202 may divide the area of the reference frame 308 into positional coordinates to define a coordinate system.

The controller 202 may perform image analysis to identify the pupil 304 within the reflection 320. For example, the controller 202 may identify pixels that likely represent the pupil based on a wavelength (e.g., color) of the pixels, edge detection by comparing dark colored pixels next to lighter colored pixels, a circular shape of a collection of the pixels, and/or the like. Optionally, other techniques may be used to identify the pupil 304 in the image data, such as using machine vision and trained object detection. The controller 202 may include or access a neural network that is trained via labeled training images to detect the eye 302 in the reflection 320, the pupil 304 in the reflection 320, and/or other features of interest present in the image data. The neural network may be trained to detect specific shapes, colors, and/or color contrasts that would indicate the presence of the eye 302, the pupil 304, or the like.

Upon identifying the pupil 304 in the image data, the controller 202 may calculate positional coordinates of the pupil 304 relative to the reference frame 308. The positional coordinates may be two-dimensional (e.g., x, y) coordinates within the positional coordinate system defined by the reference frame 308. The controller 202 may reduce the pupil 304 to a single point position, and then calculate the positional coordinates at that single point position. The controller 202 may determine a center point 322 (e.g., centroid) of the pupil 304 based on the image data. For example, the controller 202 may generate a bounding box that surrounds and encloses the pupil 304 based on the detected edges of the pupil 304, and then may calculate the center point 322 as the center of the area of the bounding box. The positional coordinates of the center point 322 are referred to herein as $(x_1, y_1)$. Optionally, the coordinate system may be defined based on a vertical "y" axis 326 and a lateral "x" axis 328 which intersect at an origin point 324 at the center of the reference frame 308. The coordinates of the center point 322 of the pupil 304 may be relative to the origin point 324. For example, the $x_1$ value may be negative because the center point 322 is to the left of the origin 324, and the $y_1$ value may also be negative because the center point 322 is below the origin 324. The coordinates of the center point 322 represent the position of the pupil 304 as detected by the controller 202.

Figure 4:
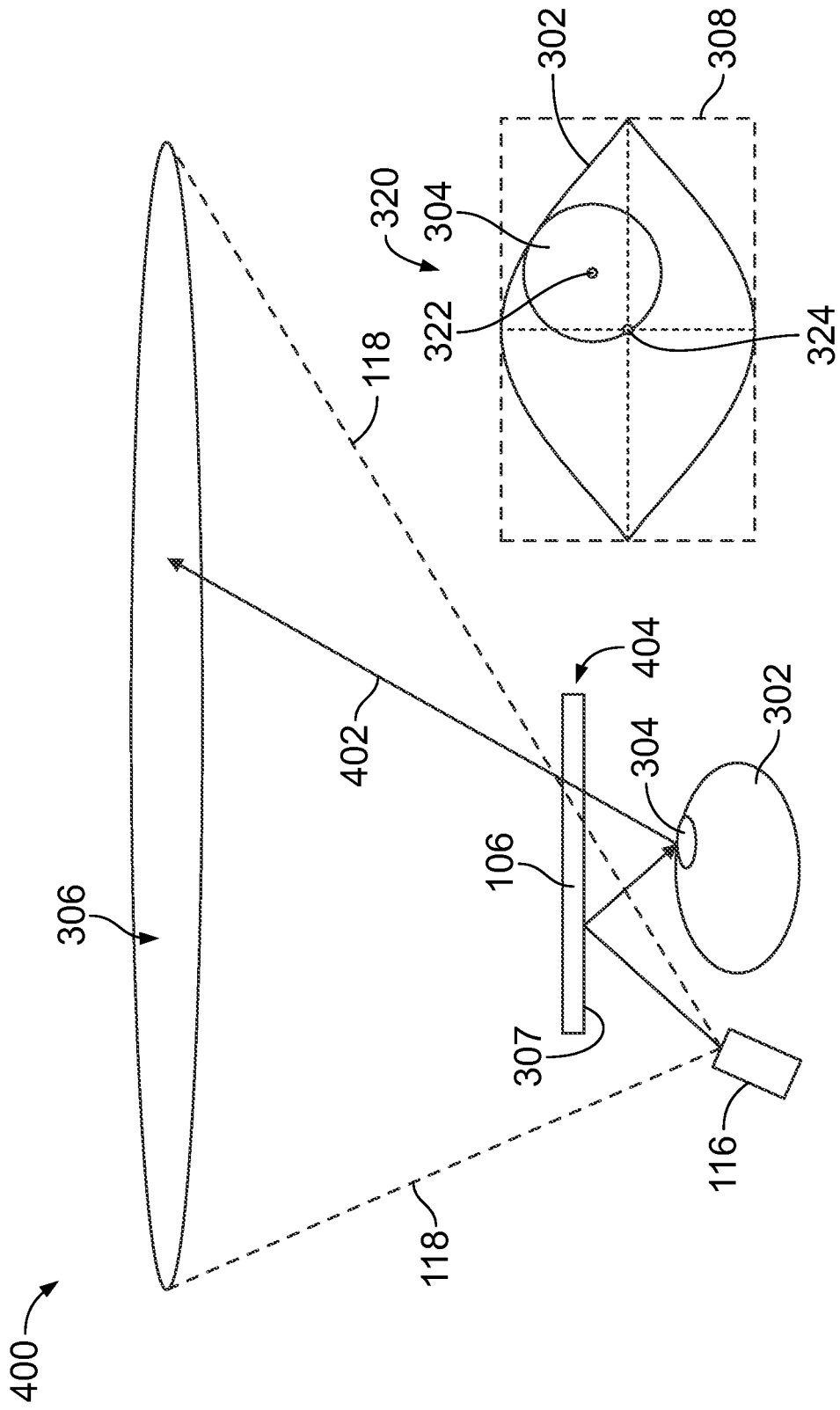
FIG. 4A is a diagram showing the eye tracking device, the lens of the wearable device, and the eye of the user gazing in a different direction relative to the gaze direction in FIG. 3A.
FIG. 4B illustrates the reflection of the user's eye on the inner surface of the lens according to the eye position shown in FIG. 4A.

FIG. 4A is a diagram 400 illustrating the eye tracking device 116, the lens 106 of the wearable device, and the eye 302 of the user, with the eye 302 gazing in a different direction relative to the gaze direction 312 in FIG. 3A. In FIG. 4A, the eye 302 is looking along a gaze direction 402 towards the right. The eye tracking system 102 (e.g., the device 116) detects the new position of the pupil 304 in the same way as described with reference to FIGS. 3A and 3B. FIG. 4B illustrates the reflection 320 of the user's eye 302 on the inner surface 307 of the lens 106 according to the eye position shown in FIG. 4A. For example, the pupil 304 in FIG. 4A is directed to the right of center, and the pupil 304 in the reflection 320 in FIG. 4B is also right of center relative to the eye 302.

The controller 202 may perform image analysis to identify the pupil 304 within the reflection 320. Then the controller 202 detects the position of the pupil 304 relative to the reference frame 308. The controller 202 may calculate positional coordinates of the pupil 304 relative to the reference frame 308. The coordinates of the center point 322 of the eye 302 at the second position shown in FIG. 4B are $(x_2, y_2)$. The $x_2$ value may be positive because the center point 322 is to the right of the origin 324, and the $y_2$ value may also be positive because the center point 322 is above the origin 324. The coordinates $(x_2, y_2)$ of the center point 322 represent the position of the pupil 304 in the updated position of the eye as detected by the controller 202.

The controller 202 may calculate the magnitude of eye movement between the first position shown in FIGS. 3A and 3B and the second position shown in FIGS. 4A and 4B. For example, the controller 202 may calculate the distance of a line segment between the first coordinates $(x_1, y_1)$ and the second coordinates $(x_2, y_2)$ to determine the magnitude. Optionally, the controller 202 may determine a vector from the positional coordinates $(x_1, y_1)$ to the positional coordinates $(x_2, y_2)$, which represents the distance and direction of pupil movement.

In an embodiment, the eye tracking system 102 may perform one or more operations based on the detected position of the pupil 304 in the reflection 320. For example, the controller 202 may calculate the gaze direction (e.g., directions 312, 402) of the eye and/or a location in the external environment 306 to which the user's gaze is directed, based on the position of the pupil 304.

The image data generated by the imaging device 118 depicts the external environment 306 beyond the lens 106, as shown in FIGS. 3A and 4A. In an embodiment, the controller 202 may segment the image data between a foreground environment 404 and the external environment 306. The foreground environment 404 may include portions of the wearable device, including the frame and the reflection 320 on the lens 106, that are depicted in the image data. The foreground environment 404 may also include portions of the user's face (e.g., tip of nose, cheek, etc.) captured in the image data. The external environment 404 includes depicted objects that are physically located beyond the lens 106 relative to the imaging device 118. For example, some objects of the external environment 306 may be depicted through the light transmissive lens 106.

The controller 202 may segment the image data to differentiate image data that represents the foreground environment 404 from image data the represents the external environment 306. The controller 202 may perform the segmentation based on one or more segmentation algorithms stored in the memory 216. The segmentation operation may involve edge detection, boundary analysis, and/or the like. The segmentation operation may be based on trained learning techniques to identify objects that are within the foreground environment 404. The controller 202 may use machine learning (e.g., artificial intelligence), such as a neural network, that is trained to identify image data depicting the frame of the wearable device, the tip of the user's nose, the reflection 320, and/or the like, and may classify that image data as being within the foreground environment 404. The reference frame 308 of the reflection 320 may be referred to as a foreground reference frame. The origin point 324 in the reference frame 308 may be referred to as a foreground reference point. Remaining image data in the field of view may be classified by the controller 202 as being within the external environment 306.

In an embodiment, the controller 202 may determine or utilize a correlation between the foreground environment 404 and the external environment 306. The controller 202 may use the correlation with the detected position of the pupil 304 to determine a location in the external environment to which the gaze of the user is directed. The correlation may represent a transfer function between the foreground reference frame 308 and a reference frame in the external environment 306. Optionally, the field of view 118 of the imaging device 108 may define the boundaries for an external reference frame. For example, the external reference frame may represent the two-dimensional plane captured within the field of view 118 at a distance from the imaging device 108 that represents the focal length of the imaging device 108.

Figure 5:
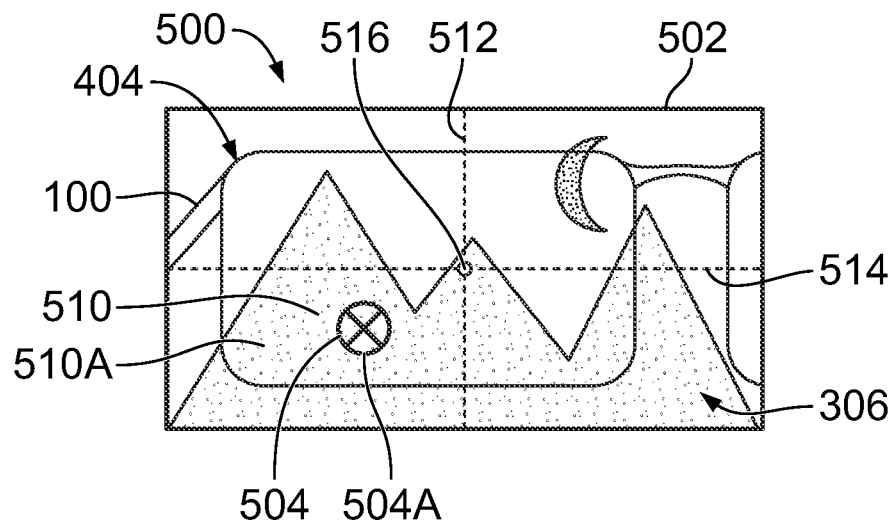
FIG. 5 illustrates an image generated by the imaging device of the eye tracking system according to an embodiment.

FIG. 5 illustrates an image 500 generated by the imaging device 108 of the eye tracking system 102 according to an embodiment. The image 500 shows both the foreground environment 404, including a portion of the wearable device 100, and the external environment 306. The perimeter of the image 500 may be defined by the field of view 118 of the imaging device 108, shown in FIGS. 3A and 4A. The controller 202 may define an external reference frame 502 based on the perimeter of the image 500 (e.g., the field of view 118). The controller 202 may divide the area of the image frame into positional coordinates to define a second coordinate system (which is different from the first coordinate system within the foreground reference frame 308). For example, the second coordinate system may include a vertical "y" axis 512 and a lateral "x" axis 514 that intersect at an origin point 516. A transfer function may be generated to correlate coordinates of the foreground reference frame 308 (e.g., the reflected view of the eye 302) to coordinates of the external reference frame 502. The transfer function correlates the foreground environment 404 to the external environment 306 depicted in the image data.

In one embodiment, the transfer function may be generated with user assistance during a guided set-up procedure to calibrate the eye tracking system 102 for a given user. For example, during the set-up procedure, the user may wear the wearable device 100 with the eye tracking device 116 mounted thereon, and may be presented with a stock image to view on the display device 208. The stock image may represent a scene with different objects. The controller 202 may prompt the user to direct the user's gaze to a first object in the scene. The user may use the input device 206 to indicate that the user is looking at the first object. In response to receiving the input signal, the controller 202 may detect the position of the pupil 304 of the user's eye 302 when viewing the first object. Then, the controller 202 may prompt the user to gaze at a second object in the scene, and may detect the new position of the user's pupil when looking at the second object. This process may repeat for different objects in the scene. The stock image may have a known coordinates in the external reference frame 502 for each of the objects in the scene. Therefore, each time the user's pupil position is recorded looking at a different specific object, the controller 202 generates a new data pair between the foreground reference frame 308 (e.g., the foreground environment 404) and the external reference frame 502 (e.g., the external environment 306). The controller 202 may generate the transfer function based on the set of data pairs during the set-up, calibration procedure. The set-up procedure may be repeated occasionally to recalibrate the eye tracking system 102.

In another embodiment, the correlation between the foreground reflection in the lens 106 and the external environment 306 may be determined (e.g., calibrated) based on geometrical calculations. Several properties used in the calculation may be constant and determinable, such as the distance from the pupil 304 to the inner surface 307 of the lens 106, the distance from the imaging device 108 to the eye 302, and the focal length of the imaging device 108. The controller 202 may use geometry to calculate the correlation (e.g. transfer function) based on these properties and a detected angle at which the imaging device 108 captures light from the pupil 304 reflected off the inner surface 307 of the lens 106.

During operation of the eye tracking system 102 the user gazes at the physical world rather than the stock image of the set-up procedure. For each detected position of the pupil 304, the controller 202 may input the coordinates of the center point 322 of the pupil 304 (relative to the foreground reference frame 308) into the transfer function to determine a location 504 in the external environment 306 to which the eye 302 is gazing. For example, the location 504 may be output by the transfer function as coordinates in the external reference frame 502. The location 504A in FIG. 5, indicated by a target symbol that is overlaid on the image 500, corresponds to the position of the pupil 304 in FIGS. 3A and 3B.

Figure 6:
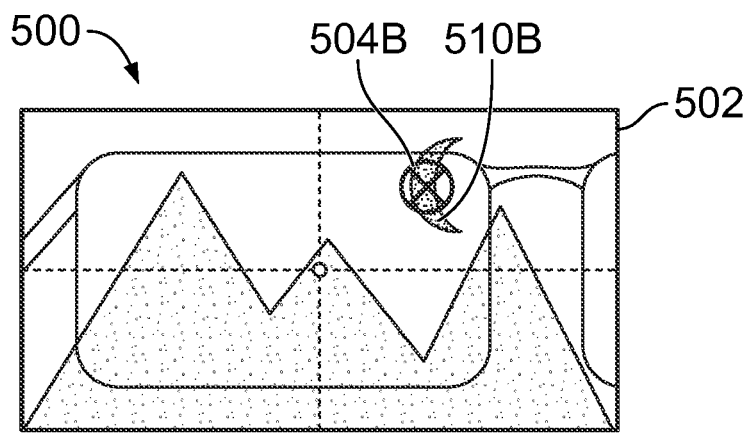
FIG. 6 illustrates the same image as FIG. 5, and identifies a second location that the user is gazing relative to the image.

FIG. 6 illustrates the same image 500 as FIG. 5, and identifies a second location 504B that the user is gazing relative to the image 500. The controller 202 determines the second location 504B by inputting the positional coordinates of the center point 322 of the pupil 304 shown in FIGS. 4A and 4B into the transfer function. The location 504B in FIG. 6, indicated by the target symbol, is above and to the right of the location 504A in FIG. 5, which correlates with the differences in pupil positioning between FIGS. 3B and 4B. The locations 504A, 504B may be used to determine the gaze directions 312, 402 and/or an angular difference between the gaze directions 312, 402.

In an embodiment, the eye tracking system 102 may provide additional information to the user based on the location 504 to which the user is gazing. For example, the eye tracking system 102 may provide information about the location 504 to the user as part of an augmented (or mixed) reality platform. For this purpose, the controller 202 may analyze the image data and identify an object 510 at the location 504 in the external environment 306 to which the gaze is directed.

To identify the objects 510 in the external environment 306 associated with the gaze locations 504, the controller 202 may use one or more image analysis techniques. In an example, the controller 202 uses machine learning (e.g., artificial intelligence), such as an artificial neural network trained to identify different objects in the external environment. The neural network may be trained to automatically detect and recognize certain specific objects depicted in image data. The neural network may have multiple layers that represent different groups or sets of artificial neurons or nodes. An input layer receives an input image, such as the image 500 in FIGS. 5 and 6, or at least portions of the image data that includes the locations 504A, 504B. The neurons or nodes are functions performed to identify objects in the input image data. The artificial neurons may apply different weights in the functions applied to an input image data to attempt to identify or segment the objects at the locations 504A, 504B.

The neurons in the layers of the neural network may examine characteristics of the pixels of the input image data, such as the intensities, colors, or the like, to determine the classification vectors for the various pixels. The neural network may assign or associate different pixels with different object classes based on the characteristics of the pixels. An object class is a type or category of an object 510 that may be present in the image 500. For example, a tree can be a first object class, a building can be a different, second object class, and a car can be a third object class. A pixel can be labeled (e.g., associated) with probabilities, confidence levels, or scores that the pixel represents various different object classes by a vector [a b c], where the values of a, b, and c indicate the probability, confidence level, or score of the pixel representing each of different classes of objects or things. The neural network may examine the classification vector of each pixel and determine which object class has the highest confidence or score for each pixel. For example, a first pixel in the input image 500 having a classification vector of [0.7 0.15 0.15] indicates that the neural network 122 calculated a 70% confidence that the first pixel represents a first object class, a 15% confidence that the first pixel represents a second object class, and a 15% confidence that the first pixel represents a third object class. The neural network may determine that each pixel in the image 500 represents the object class having the greatest or largest confidence level or score in the corresponding classification vector for that pixel. For example, the neural network may determine that the first pixel described above represents a tree due to the 70% confidence. This process can be repeated for several, or all, other pixels in the input image data.

In the illustrated embodiment, the controller 202 may identify the object 510A in FIG. 5 as a mountain, and may identify the object 510B in FIG. 6 as the moon. Optionally, the machine learning may be able to uniquely identify the objects 510A, 510B, beyond identifying a general type or class of the objects 510A, 510B. For example, the controller 202 may identify the mountain 510A as a specific mountain, such as Pikes Peak.

The controller 202 may perform an operation based on the object 510 that is identified. For example, the controller 202 may control the display device 208 to display graphic indicia on a display screen visible to the user wearing the wearable device 100. The graphic indicia relates to the object 510 that is identified. In an embodiment, the display device 208 is mounted on the wearable device 100 (as part of the eye tracking device 116), and the display device 208 displays the graphic indicia relating to the viewed object 510 on at least one of the lenses 106 of the wearable device 100.

Figure 7:
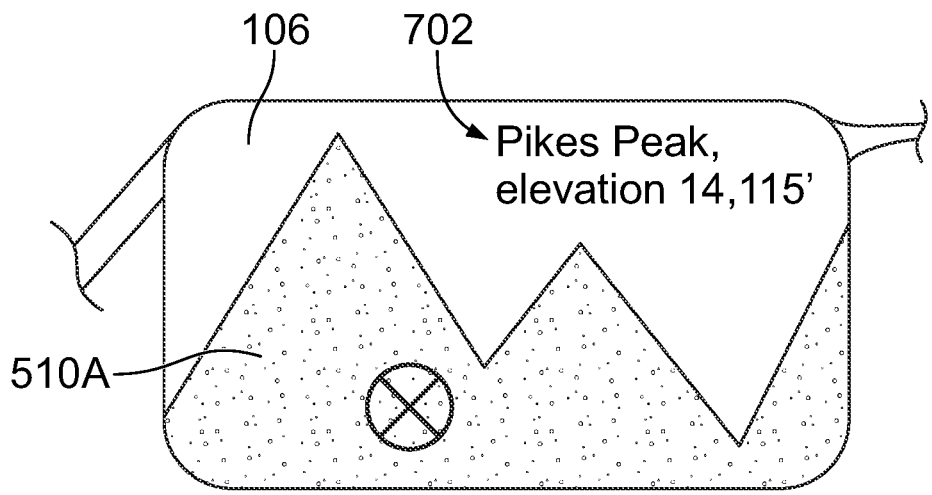
FIG. 7 illustrates a lens of the wearable device as viewed by a user during operation of the eye tracking system according to an embodiment.

FIG. 7 illustrates a lens 106 of the wearable device 100 as viewed by a user during operation of the eye tracking system 102 according to an embodiment. FIG. 7 shows a head-up display feature in which the display device 208 display graphic indicia 702 related to the object 510A to which the user is gazing. For example, the controller 202 may use image analysis to identify the object 510A as the mountain named Pikes Peak in Colorado, USA. The controller 202 may generate a message that provides information about Pikes Peak to the user. The display device 208 is configured to display the message as the graphic indicia 702 on the lens 106, such that the user can view the graphic indicia 702 while peering through the lens 106. The graphic indicia 702 in the illustrated example identifies the mountain as "Pikes Peak", and provides the elevation of the mountain as 14,115 feet above sea level. The graphic indicia 702 is presented near the top of the lens 106, to avoid unduly distracting or interfering with the vision of the user.

In the example shown in FIG. 6, in which the object 510B is identified as the moon, the controller 202 may generate graphic indicia for display on the lens 106 which provides information about the moon. The information that is presented may include the current phase of the moon, or the like. The user may be able to actuate the input device 206 shown in FIG. 2 to selectively activate and deactivate the head-up, augmented display feature shown in FIG. 7.

The controller 202 may perform other operations based on the object 510 that is identified. For example, the controller 202 may send a notification to a user computer device based on the identified object 510 to which the user is gazing. The notification may provide the identity of the object 510. In another example, the controller 202 may generate an alert. For example, in a driver attentiveness application, the object 510 that is identified may be a smartphone, an infotainment screen in a vehicle, or the like. The controller 202 detects that the user is not being attentive to the route based on the identified object 510 and optionally an amount of time that the user's attention is directed away from the route to the object 510. In response, the controller 202 may generate an alert that is provided via vibration of the wearable device 100, a sound, a flashing light, or the like. The alert may prompt the user to direct attention back to the route and the operation of the vehicle. In another example, the controller 202 may detect that the driver is inattentive based on a lack of the pupil 304 being shown in the reflection 320. For example, if the driver is drowsy, the pupil 304 may be covered by the eyelid. If the controller 202 fails to detect the pupil 304 for at least a threshold time period (e.g., 2 seconds, 3 seconds, 5 seconds, etc.), the controller 202 may generate the alert. In another example operation, the controller 202 may generate a record (e.g., update a log) of the objects 510 that are identified, and store the record in the memory 216. The record may include a series of objects 510 that the user looked at over time. The record may be used for data analysis, accident reconstruction, and/or the like.

Figure 8:
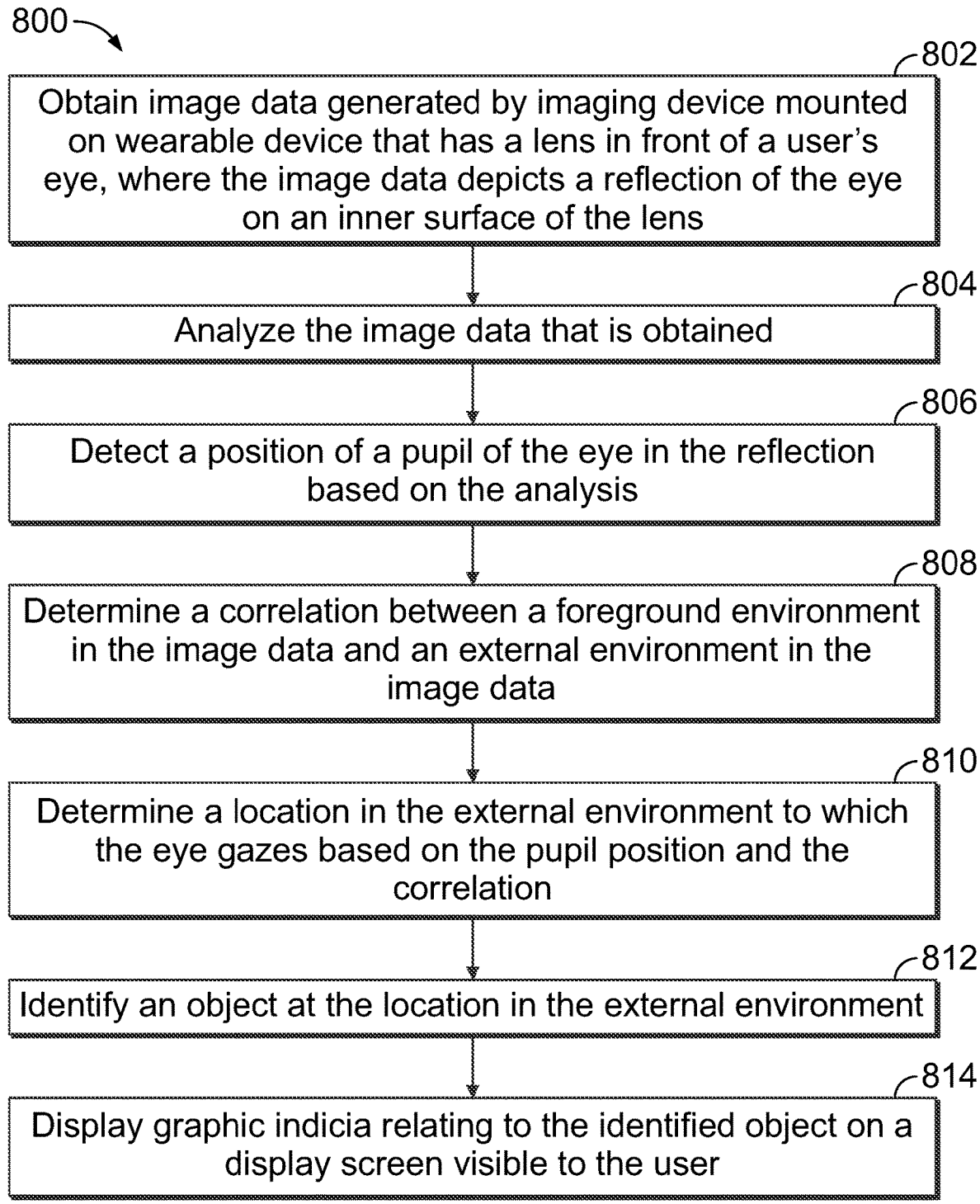
FIG. 8. is a flow chart of a method of eye tracking according to an embodiment.

FIG. 8 is a flow chart 800 of a method of eye tracking according to an embodiment. The method may be performed by the eye tracking device 116. For example, the controller 202 may perform at least some of the steps of the method. The method optionally may include at least one additional step than shown, at least one fewer step than shown, and/or at least one different step than shown in FIG. 8.

At step 802, the controller 202 obtains image data generated by an imaging device 108 mounted on a wearable device 100. The wearable device 100 includes a lens 106 that is light transmissive and positioned in front of an eye of a user that is wearing the wearable device 100. The imaging device 108 has a field of view 118 that captures an inner surface 307 of the lens 106 and a reflection 320 of the eye on the inner surface 307. Optionally, the method may include removably attaching the eye tracking system 116, including the imaging device 108, to a frame 104 of the wearable device 100.

At step 804, the controller 202 analyzes the image data that is obtained. At step 806, the controller 202 detects a position of a pupil of the eye in the reflection 320 based on the analysis of the image data. The controller 202 may detect the position of the pupil in the reflection 320 relative to the eye in the reflection 320, the lens 106 in the reflection 320, and/or the field of view 118 of the imaging device 108.

At step 808, the controller 202 may determine a correlation between a foreground environment 404 in the image data and an external environment 306 in the image data. The correlation may be represented by a transfer function that is generated by the controller 202. The controller 202 may segment the image data between the foreground environment 404 and the external environment 306 prior to determining the correlation. The foreground environment 404 includes the inner surface 308 of the lens 106 and the reflection 320. The external environment 306 includes objects disposed beyond the lens 106 relative to the imaging device 108.

At step 810, the controller 202 may determine a location 504 in the external environment 306 to which a gaze of the eye is directed based on the position of the pupil and the correlation between the foreground environment 404 and the external environment 306. At step 812, the controller 202 may identify an object 510 at the location 504 in the external environment 306 to which the gaze is directed. At step 814, the controller 202 may control a display device 208 to display graphic indicia 702 on a display screen visible to the user. The graphic indicia 702 may be content that is related to the object 510 that is identified.

The eye tracking system and method described herein provides reliable, accurate eye tracking by detecting a position of the pupil based on a reflection of the user's eye on an inner surface of a lens. The hardware of the eye tracking system may be out of the direct line of sight of the user, to avoid obstructing the user's vision of the physical world. The eye tracking system may not emit IR light into the user's eyes. The eye tracking system may be utilized in virtual reality and/or augmented reality platforms. The eye tracking system may be removably coupled to a wearable device to enable retrofitting and/or substitution of the wearable device.

Closing Statements

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the Figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified. The program instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally, or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Further, in the following claims, the phrases "at least A or B", "A and/or B", and "one or more of A and B" (where "A" and "B" represent claim elements), are used to encompass i) A, ii) B or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An eye tracking system comprising:
   an imaging device configured to be mounted on a wearable device, the wearable device including at least a first lens that is light transmissive and positioned in front of at least a first eye of a user that is wearing the wearable device, the imaging device having a field of view that captures an inner surface of the first lens and a reflection of the first eye on the inner surface;
   a memory configured to store program instructions; and
   one or more processors operably connected to the memory and the imaging device, wherein the program instructions are executable by the one or more processors to:
   analyze image data generated by the imaging device; and
   detect a position of a pupil of the first eye in the reflection based on the analysis of the image data by calculating coordinates of a center point of the pupil in the reflection within a foreground reference frame in the image data.

2. The eye tracking system of claim 1, wherein the imaging device is configured to generate the image data in a visible wavelength range.

3. The eye tracking system of claim 1, wherein the imaging device is mounted such that the field of view does not directly capture the first eye of the user.

4. The eye tracking system of claim 1, further comprising a light source configured to be mounted to the wearable device and to emit light towards the inner surface of the first lens for providing the reflection.

5. The eye tracking system of claim 1, wherein the one or more processors are configured to detect the position of the pupil in the reflection relative to one or more of the first eye in the reflection, the first lens in the reflection, or the field of view of the imaging device.

6. The eye tracking system of claim 1, wherein the one or more processors are configured to segment the image data to a foreground environment and an external environment, the foreground environment including the inner surface of the first lens and the reflection, the external environment disposed beyond the first lens, the one or more processors configured to determine a location in the external environment to which a gaze of the first eye is directed based on the position of the pupil and a correlation between the foreground environment and the external environment.

7. The eye tracking system of claim 6, wherein the one or more processors are configured to analyze a portion of the image data corresponding to the location in the external environment to which the gaze is directed, and to identify an object at the location in the external environment based on the portion of the image data.

8. The eye tracking system of claim 7, wherein the one or more processors are configured to perform an operation based on the object that is identified.

9. The eye tracking system of claim 8, wherein the one or more processors are configured to control a display device to display graphic indicia on a display screen visible to the user, the graphic indicia relating to the object that is identified.

10. The eye tracking system of claim 9, further comprising the display device, wherein the display device is mounted on the wearable device and displays the graphic indicia relating to the object on at least the first lens for viewing by the user.

11. The eye tracking system of claim 1, wherein the one or more processors are configured to determine a location in an external environment to which a gaze of the first eye is directed by inputting the coordinates of the center point of the pupil into a transfer function that represents a correlation between the foreground reference frame and an external reference frame.

12. The eye tracking system of claim 1, further comprising the wearable device, wherein the wearable device is one of eyeglasses or goggles.

13. A method comprising:
analyzing image data generated by an imaging device mounted on a wearable device, the wearable device including at least a first lens that is light transmissive and positioned in front of at least a first eye of a user that is wearing the wearable device, the imaging device having a field of view that captures an inner surface of the first lens and a reflection of the first eye on the inner surface; and
detecting a position of a pupil of the first eye in the reflection based on the analysis of the image data by calculating coordinates of a center point of the pupil in the reflection within a foreground reference frame in the image data.

14. The method of claim 13, further comprising removably attaching the imaging device to a frame of the wearable device.

15. The method of claim 13, wherein detecting the position of the pupil comprises detecting the position of the pupil in the reflection relative to one or more of the first eye in the reflection, the first lens in the reflection, or the field of view of the imaging device.

16. The method of claim 13, further comprising:
segmenting the image data between a foreground environment and an external environment, the foreground environment including the inner surface of the first lens and the reflection, the external environment disposed beyond the first lens relative to the imaging device; and
determining a location in the external environment to which a gaze of the first eye is directed based on the position of the pupil and a correlation between the foreground environment and the external environment.

17. The method of claim 16, further comprising identifying an object at the location in the external environment to which the gaze is directed.

18. The method of claim 17, further comprising controlling a display device to display graphic indicia on a display screen visible to the user, the graphic indicia relating to the object that is identified.

19. A computer program product comprising a non-transitory computer readable storage medium, the non-transitory computer readable storage medium comprising computer executable code configured to be executed by one or more processors to:
analyze image data generated by an imaging device mounted on a wearable device, the wearable device including at least a first lens that is light transmissive and positioned in front of at least a first eye of a user that is wearing the wearable device, the imaging device having a field of view that captures an inner surface of the first lens and a reflection of the first eye on the inner surface; and
detect a position of a pupil of the first eye in the reflection based on the analysis of the image data by calculating coordinates of a center point of the pupil in the reflection within a foreground reference frame in the image data.

* * * * *